April 23, 1935.   M. L. HILLMER   1,998,719
HORN BUTTON
Filed Dec. 22, 1933
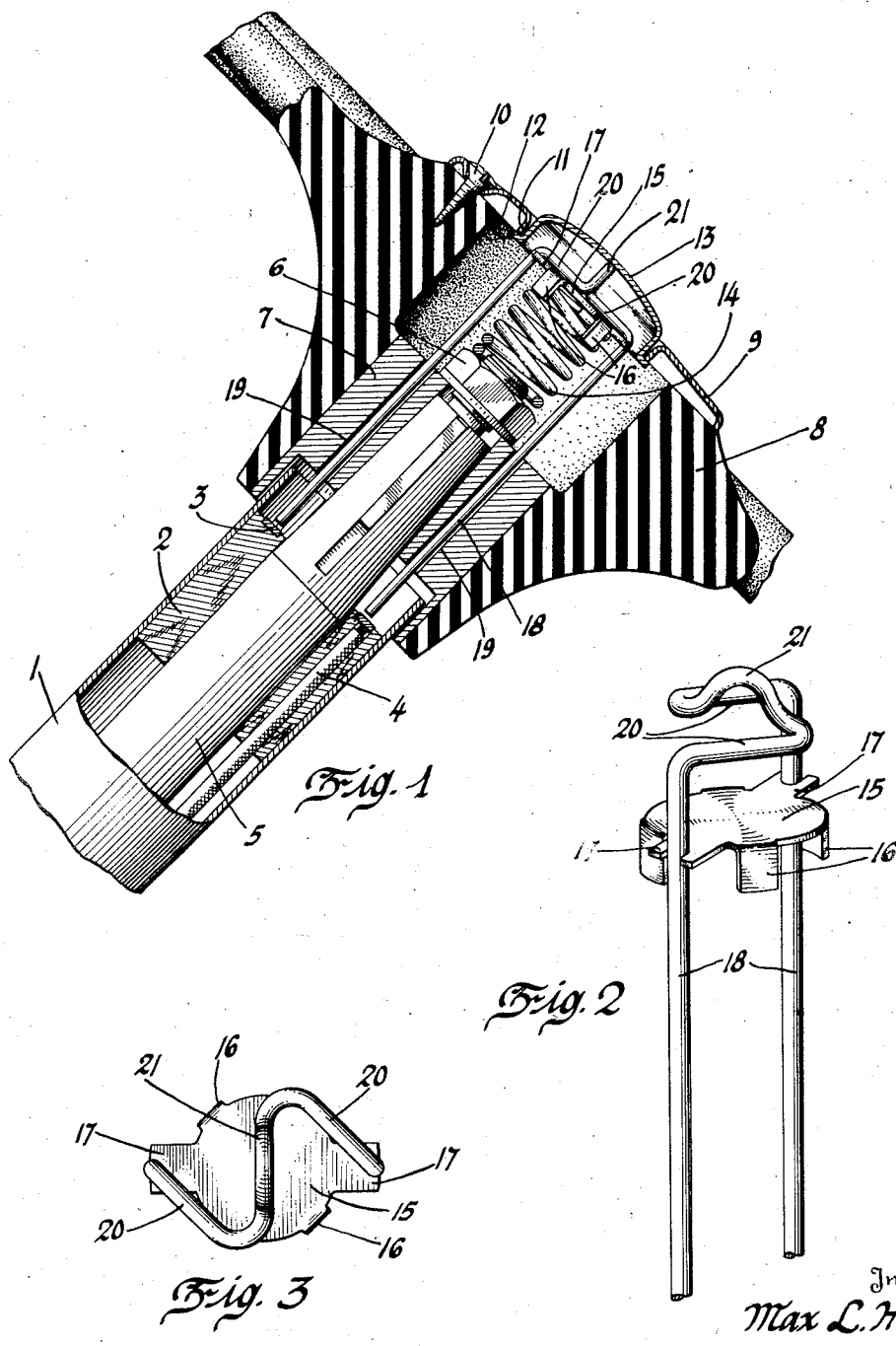
Inventor
Max L. Hillmer
By Blackmore, Spencer & Flint
Attorney Patented Apr. 23, 1935

1,998,719

UNITED STATES PATENT OFFICE 1,998,719

HORN BUTTON

Max L. Hillmer, Saginaw, Mich., assignor to General Motors Corporation, Detroit, Mich., a corporation of Delaware Application December 22, 1933, Serial No. 703,522

5 Claims. (Cl. 200—59)

For controlling the electrical circuit containing the signal horn on a motor vehicle it is customary to locate a switch at the top of the steering column with a depressible button at the center of the steering wheel, and certain details of an assembly of this kind are here concerned.

The present invention has to do with an improvement on a construction that has been used on Chevrolet automobiles and in which a hairpin contact element carried by the rotatable steering wheel is movable axially against the force of a spring upon depression of a button into engagement with a commutator ring fixedly mounted in the stationary housing for the steering shaft. It is an object of the invention to improve on this simple and economical construction, and without increasing manufacturing costs, provide through a slight change in the formation of the U-shaped end of the hairpin, a larger and better seat for the spring and a tilting mounting for the horn button.

Other objects and advantages of the invention will become apparent during the course of the following specification taken in connection with the accompanying drawing, wherein Figure 1 is a sectional view showing the assembly of parts in the upper end of a steering column, and Figures 2 and 3 are respectively a perspective view and a top plan view of the hairpin contact element.

Referring to the drawing, the numeral 1 indicates a tubular housing of the steering column fixedly mounting at its upper end an insulator sleeve 2 for a commutator ring 3. The commutator ring 3 is electrically connected with the wire 4 of the horn circuit, extending through the sleeve 2 and enclosed within the housing 1. Also enclosed by the housing is a rotatable steering shaft 5 having a bearing in the sleeve 2 and being provided with a tapered end on which is splined and secured by a retainer nut 6 a metal sleeve 7 mounted in the hub 8 of the steering wheel.

Over a central cavity in the hub 8 is a cover 9, secured as by means of a series of screws 10, and provided with a central opening bounded by a dependent flange 11. Mounted within the opening and provided with an outturned rim 12 for outward seating engagement with the flange 11 is a domed horn bottom 13 of stamped metal or molded rubber. Beneath the button and within the hub cavity is a coil spring 14 seating at one end against the nut 6 and at its opposite end against a disc or plate 15, which carries dependent flanges or tongues 16 to receive and retain the endmost coil of the spring.

The disc is also provided with a pair of diametrically oppositely disposed apertured or bifurcated ears 17—17, which receive the dependent pins 18 of the hairpin contact element. These pins are carried by the hub for rotation therewith and extend slidably through apertures 19 in the metal sleeve 7 for movement axially of the shaft 5 against the resistance of the spring 14 to bring their lower ends into engagement with the commutator ring 3 and close the horn circuit by grounding the ring through the metal parts of the steering column.

The U-shaped end of the hairpin contact element is of substantially Z-shape in plan view, as is clearly shown in Figure 3. Its two end legs 20 constitute angular extensions integral with the respective pins 18 and lie in spaced apart relation for contact with the upper surface of the disc 15, while the cross or connecting member 21 is bowed upwardly above the common plane of the legs 20 to provide a rocking surface making substantially point contact with the central portion of the domed button 13. Thus the button is tiltably mounted and there is eliminated the necessity for a straight downward thrust thereon in order to depress the contact element, against the force of the spring acting on the spaced legs at the upper end of the contact element.

I claim:

1. In a horn button assembly for a steering wheel mounted on the upper end of a rotatable shaft enclosed within the stationary housing, an insulated contact ring fixedly carried by the housing, a movable contact element carried by the wheel and comprising a pair of spaced fingers adapted for engagement with said ring in all positions of relative adjustment of the wheel and a connection between the fingers of substantially Z-shape in plan with the two legs thereof lying in the same plane and the cross bar being bowed upwardly above the plane of the legs, a tiltable button in substantially point contact with said bowed cross bar and a spring element bearing on said legs to yieldingly resist movement of the element upon depression of the button.

2. A switch assembly having a button depressible against the force of a coil spring to move a pair of spaced pins into circuit closing position and being characterized by a spring seat comprising a disc having apertured tongues to receive the pins and dependent flanges to receive therebetween the endmost spring coil, legs extending angularly from the pins in spaced relation to each other and resting on the top of said disc, and an upwardly bowed connection between said legs for point engagement with said button.

3. A steering wheel assembly having a horn button depressible against the force of a spring to move a pair of pins into engagement with a contact ring, and being characterized by a member between the button and spring, carrying said pins and comprising extensions integral with the respective pins and projecting therefrom in spaced apart relation in a common plane angular to the pins to provide an enlarged spring seat, and means connecting said extensions and projecting above the plane thereof for point contact with the button.

4. A steering wheel assembly having a horn button depressible against the force of a spring to close a switch controlling the horn circuit, and being characterized by a switch contact member having a dependent leg extending through the hub of the wheel for engagement with a commutator ring and a portion interposed between the spring and button and provided with a curved projection with which the button has rocking engagement.

5. In a horn button assembly for steering posts wherein a hairpin contact element is carried by the steering wheel for movement against a resisting spring into engagement with a fixed contact ring to close the horn circuit, a connection between the pins of said element of substantially zigzag shape to provide an enlarged seat for said spring, and a portion of said connection extending above the general plane thereof for fulcruming engagement with a horn button.

MAX L. HILLMER.